United States Patent
Satyavolu et al.

(10) Patent No.: US 6,517,587 B2
(45) Date of Patent: *Feb. 11, 2003

(54) NETWORKED ARCHITECTURE FOR ENABLING AUTOMATED GATHERING OF INFORMATION FROM WEB SERVERS

(75) Inventors: Ramakrishna Satyavolu, Santa Clara, CA (US); Suman Kumar Inala, Santa Clara, CA (US); P. Venkat Rangan, San Diego, CA (US)

(73) Assignee: Yodlee.Com, Inc., Redwood Shores, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,914

(22) Filed: Jul. 27, 1999

(65) Prior Publication Data

US 2002/0023104 A1 Feb. 21, 2002

Related U.S. Application Data

(63) Continuation-in-part of application No. 09/323,598, filed on Jun. 1, 1999, now Pat. No. 6,199,077, which is a continuation-in-part of application No. 09/208,740, filed on Dec. 8, 1998, now Pat. No. 6,412,073.

(51) Int. Cl.$^7$ .......................... G06F 17/30; G06F 17/00; G06F 15/16

(52) U.S. Cl. ........................ 715/501.1; 707/3; 707/5; 707/103; 709/219; 709/238

(58) Field of Search .................. 707/501.1, 3, 511, 707/102, 6, 103, 5; 709/238, 221, 203, 223, 219; 370/357; 715/501.1

(56) References Cited

U.S. PATENT DOCUMENTS

| 5,442,771 A | * | 8/1995 | Filepp et al. ............... 709/219 |
| 5,768,577 A | | 6/1998 | Kleewein et al. ............. 707/10 |
| 5,787,425 A | * | 7/1998 | Bigus ............................ 707/6 |

(List continued on next page.)

OTHER PUBLICATIONS

Severance, C., Could LDAP be the next killer DAP?, IEEE Computer, vol. 30, Issue 8, pp. 88–89, Aug. 1997.*
Gardner, Stephen R., Building the data warehouse, Communications of the ACM, vol. 41, Issue 9., pp. 52–60, Sep. 1998.*
Bontempo, Charles et al., The IBM data warehouse architecture, Communications of the ACM, vol. 41, Issue 9, pp. 38–48, Sep. 1998.*

*Primary Examiner*—Joseph H. Feild
*Assistant Examiner*—William L. Bashore
(74) *Attorney, Agent, or Firm*—Donald R. Boys; Central Coast Patent Agency, Inc.

(57) ABSTRACT

A data-gathering and reporting system for collecting WEB summaries from the Internet for individual subscribers to a Portal subscription system has a plurality of gatherer servers each connected to the Internet, to an ascending hierarchy of work request distribution servers, and to a ascending hierarchy of collector servers. A work request generator at the top of the hierarchy of distribution servers generates work requests for collecting WEB summaries, and a filer server at the top of the hierarchy of collector servers writes data to a database. Work flow is by work requests from the work request generator down the hierarchy of distributor servers to the gatherer servers, where work requests are accomplished by gathering WEB summaries from Internet servers according to the work requests, and by data collected from the gatherer servers up the hierarchy of collector servers to the filing server.

6 Claims, 2 Drawing Sheets

U.S. PATENT DOCUMENTS

| | | | | |
|---|---|---|---|---|
| 5,838,918 A | * | 11/1998 | Prager et al. | 709/221 |
| 5,893,128 A | * | 4/1999 | Nauckhoff | 707/511 |
| 5,924,090 A | * | 7/1999 | Krellenstein | 707/5 |
| 5,937,168 A | * | 8/1999 | Anderson et al. | 370/351 |
| 6,021,409 A | * | 2/2000 | Burrows | 707/102 |
| 6,085,188 A | * | 7/2000 | Bachmann et al. | 707/3 |
| 6,085,238 A | * | 7/2000 | Yuasa et al. | 709/223 |
| 6,101,500 A | * | 8/2000 | Lau | 707/103 |
| 6,122,673 A | * | 9/2000 | Basak et al. | 709/238 |
| 6,169,992 B1 | * | 1/2001 | Beall et al. | 707/103 |
| 6,185,601 B1 | * | 2/2001 | Wolff | 709/203 |
| 6,381,640 B1 | * | 4/2002 | Beck et al. | 709/223 |

\* cited by examiner

NETWORKED ARCHITECTURE FOR ENABLING AUTOMATED GATHERING OF INFORMATION FROM WEB SERVERS

CROSS-REFERENCE TO RELATED DOCUMENTS

The present invention is related as a continuation in part (CIP) to a patent application entitled "Method and Apparatus for Obtaining and Presenting WEB Summaries to Users" filed on Jun. 1, 1999, for which Ser. No. 09/323,598 is assigned, having U.S. Pat. No. 6,199,077, and which is incorporated herein by reference, which is a CIP of application Ser. No. 09/208,740, filed Dec. 8, 1998, now U.S. Pat. No. 6,412,073, also incorporated herein by reference.

FIELD OF THE INVENTION

The present invention is in the field of digital network information gathering from network servers and pertains more particularly to methods and apparatus for providing and operating a networked system of machines dedicated to performing automated data gathering, processing, and presentation of such data.

BACKGROUND OF THE INVENTION

The information network known as the World Wide Web (WWW), which is a subset of the well-known Internet, is arguably the most complete source of publicly accessible information available. Anyone with a suitable Internet appliance such as a personal computer with a standard Internet connection may connect to the Internet and navigate to many thousands of information pages (termed web pages) stored on Internet-connected servers for the purpose of garnering information and initiating transactions with hosts of such servers and pages.

Information travels over the Internet network through many connected computers known as nodes in the art. Internet nodes include any hosted machines dedicated to performing a service such as file serving, data storing, data routing, and so on. Such nodes are generally loosely associated with each other only by universal resource locator (URL) addressing and mapped network paths.

Some data initiated by or requested by users is not protected from being intercepted by some network-connected nodes and therefore may perhaps be observed by third parties due to the nature of publicly-shared bandwidth over the Internet. However, various means for protecting data from being observed by third parties are established and routinely practiced by entities hosting pluralities of nodes connected to the Internet. Such methods include the use of firewall technology, secure servers, and private sub-networks connected to the Internet network.

Many companies doing business on the Internet host semi-private data networks comprising a plurality of computer nodes dedicated to the provision of proprietary information and related data. Certain authorized users such as those working for the company or those having password access and/or active and verifiable accounts with the company may access such data. For example, a large company may host a plurality of file servers, including connected data storage systems wherein users may search for and access data stored for the purpose by the company. Such sub-nets, as they are often termed, use the Internet as a connective wide area network (WAN) and the data travels through shared bandwidth connections. Although a user may be protected from third party interceptions of data sent or requested the user must generally navigate to each URL where data is available. If a search engine is provided to assist a user in searching for specific data made available by the company, it is limited to searching only the nodes hosted by the company or data from third party nodes that is made available through cooperative URL linking or posting.

An information gathering, summarization and presentation system known to the inventor and described in the related patent application listed under the cross-reference section uses an Internet portal and software suite to allow users to request and obtain data including Web-page summaries containing specific data found by using a unique scripting method supplied by a knowledge worker. In some embodiments such data may also be pushed to a user subscribing to the service.

A service such as that described above requires a considerable amount of processing power in order to service a very large client base in terms of job processing. A desired goal is to automate such an information gathering and presentation service so as to be wholly or largely transparent to individual users. Prior art network architectures do not possess the processing power nor the dedicated cross-communication capabilities that would be required for such a service to be wholly automated and be able to serve a mass clientele.

What is clearly needed is a dedicated and hierarchical network of cooperating computer-nodes that is adapted to fulfill a very large number of automatically-scheduled and user-initiated data requests in a wholly automated and transparent fashion. Such a networked system could be scaleable in that it may be easily expanded in terms of adding machinery according to user demand. Such a system would save users and service providers much time and labor associated with obtaining optimum and efficient results from an information gathering and presentation service.

SUMMARY OF THE INVENTION

In a preferred embodiment of the present invention a data-gathering and reporting system for collecting data from a wide area network (WAN) is provided, comprising a database stored in a data repository; a first server having access to the data base and organizing data-gathering work assignments from data in the database; a hierarchical network of distributor servers having a highest level connected to the first server and expanding to a lowest level, with distributor servers at different levels connected by data links and distributing work assignments to lower levels on demand from the distributor servers at lower levels; a plurality of gatherer servers connected by data links to the lowest level of the hierarchy of distributor servers and to the WAN, the lowest level of distributor servers distributing work assignments to the gatherer servers on demand from the gatherer servers, the gatherer servers accomplishing the work assignments distributed by the distributor servers and queueing data collected from the WAN as a result of the work assignments; a hierarchical network of collector servers having a lowest level connected to the gatherer servers and contracting to a highest level, the gatherer servers communicating data collected to the lowest level of collector servers, with collector servers at different levels connected by data links and delivering collected data to higher levels; and one or more filing servers connected to the highest level of collector servers, the filing servers communicating with the database in the data repository, the collector servers delivering collected data to the one or more filing servers, and the filing servers writing the collected data to the database.

In one important embodiment the WAN is the Internet, and data is collected from WEB servers on the Internet. Also in a preferred embodiment gating of work assignments and data between one server and another in the distributor server hierarchy is by the one server having a queue with an adjustable threshold, and demanding data or work assignments from the other server as a result of the queue level falling to the threshold. Latency and database writing efficiency may be adjusted by adjusting queue thresholds among servers, and server power and capacity required in a system is adjusted by scaling the number of servers and number of hierarchical levels of servers.

In some embodiments priority is assigned to work assignments, and work assignments and collected data are gated from server to server according to assigned priority as well as by need. Also in some embodiments work assignments are expressed in a markup language, allowing all information required to fill an assignment to be encapsulated such that only the one or more filing servers need be connected to the database.

In a preferred embodiment the system is associated with an Internet subscription server, and the work assignments are for collecting data from WEB pages associated with individual subscribers. In this case some work assignments may be automatically scheduled for individual subscribers and some assignments may be on demand from individual subscribers.

In another aspect of the invention a data-gathering and reporting system for collecting WEB summaries from the Internet for individual subscribers to a Portal subscription system is provided, comprising a plurality of gatherer servers each connected to the Internet, to an ascending hierarchy of work request distribution servers, and to an ascending hierarchy of collector servers; a work request generator at the top of the hierarchy of distribution servers, generating work requests for collecting WEB summaries; and a filer server at the top of the hierarchy of collector servers, the file server connected to and writing data to a database. Flow is by work requests from the work request generator down the hierarchy of distributor servers to the gatherer servers where work requests are accomplished by gathering WEB summaries from Internet servers according to the work requests, and by data collected from the gatherer servers up the hierarchy of collector servers to the filing server, and wherein flow is gated on demand down the hierarchy of distributor servers by each server from a previous server in the direction of flow.

In this system gating of work assignments and data between one distribution server and another is by the one server having a queue with an adjustable threshold, and demanding data or work assignments from the other server as a result of the queue level falling to the threshold. Latency and database writing efficiency is adjusted by adjusting queue thresholds among servers, and server power and capacity required in a system is adjusted by scaling the number of servers and number of hierarchical levels of servers. In some cases priority may be assigned to work assignments, and work assignments and collected data may be gated from server to server according to assigned priority as well as by need. Also in a preferred embodiment work assignments are expressed in a markup language, allowing all information required to fill an assignment to be encapsulated such that only the one or more filing servers need be connected to the database.

In another aspect of the invention methods are provided for practicing the invention using the system of the invention. In the embodiments of the invention taught below in enabling detail, for the first time a scalable and very efficient system for gathering large amounts of data on the Internet is provided, where the data collected may be directed by work assignments in small increments. There are many advantages. For example, the system of the invention relieves the user of the necessity of navigating the clutter of the Internet to find what is needed on a daily basis. It also provides immediate access for the user to information from multiple sources, because information is gathered on behalf of a user continuously. Various second-level service may also be provided, such as access from wireless internet appliance devices.

BRIEF DESCRIPTION OF THE DRAWING FIGURES

DESCRIPTION OF THE PREFERRED EMBODIMENTS

It was described in the background section that in order to provide a viable data gathering and presentation system for servicing a mass clientele, such a system should be dedicated, automated and possess enough processing power to fill a large and continuous user demand. To this end, the inventors provide a scaleable networked architecture that is dedicated to achieving the goals of the present invention in an automated fashion and that is transparent to the user. Such an architecture is taught in enabling detail below.

Figure 1:
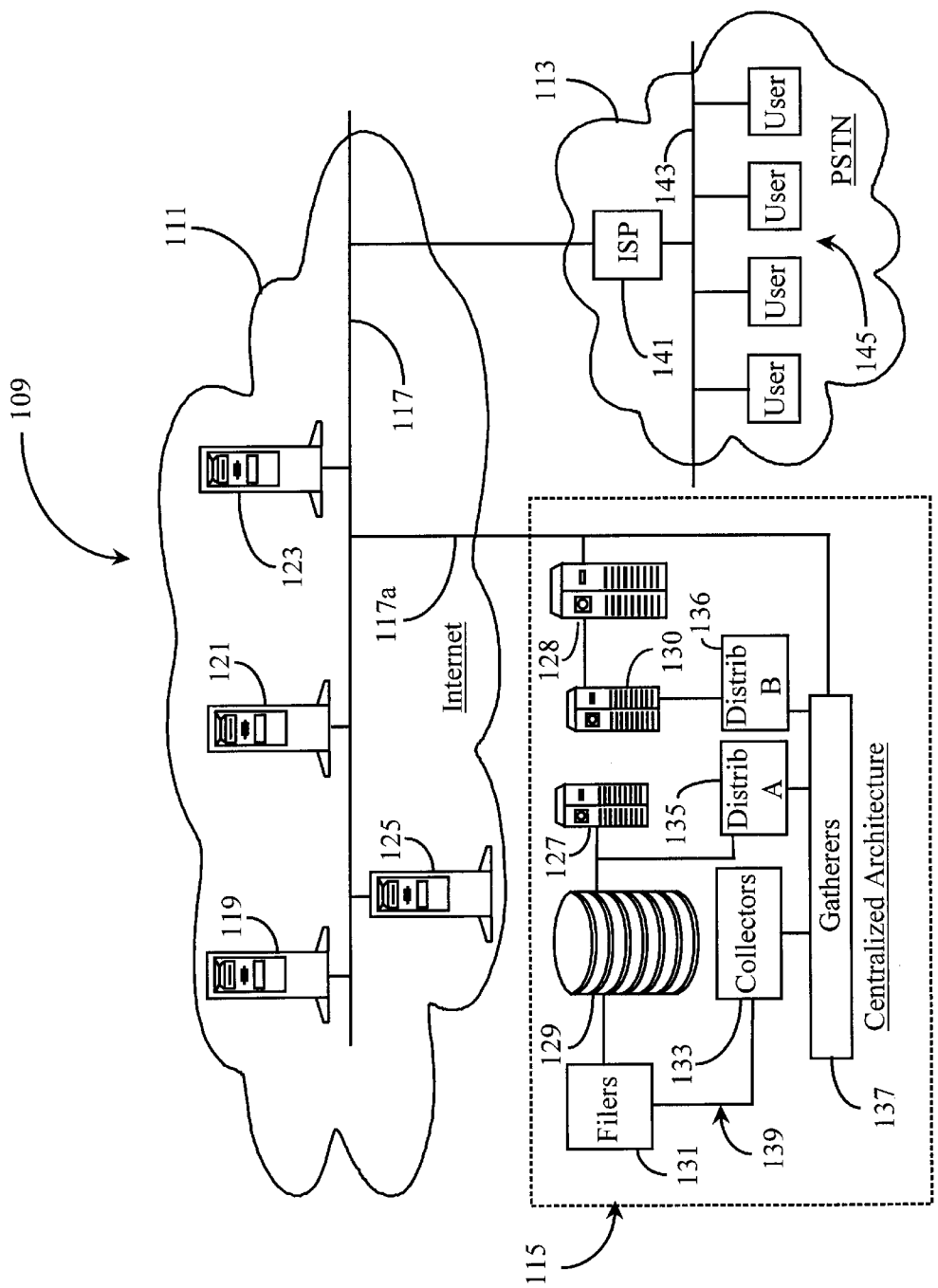
FIG. 1 is an architectural overview of a data-gathering network, components, and connectivity according to an embodiment of the present invention.

FIG. 1 is an architectural overview of a data-gathering network 109 and components thereof according to an embodiment of the present invention. Network 109 comprises a Data-packet network 111, an automated data gathering system 115, a PSTN network 113, and a plurality of connected users 145.

Data-packet network 111 may be any type of wide area network (WAN) that is known in the art that is capable of data-packet communication. In this embodiment, network 111 is the well-known Internet network, and will hereinafter be referred to as Internet 111. The advantage of using Internet 111 is that it is the largest publicly-accessible data-packet medium available. Another advantage to using Internet 111 is that data communication protocols are well established and standardized. However, any data packet network may be used as long as suitable communication protocols, of which many are known, are in place. Other than the Internet such networks include private corporate Intranets and the like.

Internet 111 comprises a plurality of exemplary WEB servers, 119, 121, 123, and 125, connected to an Internet backbone 117 as is known in the art. Servers 119–125 are adapted as normal file servers dedicated to serving WEB pages in a familiar format such as Hyper Text Markup Language (HTML). These servers are equivalent to servers 23, 25, and 27 of the cross-referenced patent application Ser. No. 09/323,598, from which Web summaries may be gathered.

Internet 111 is connected to a public switched telephone network (PSTN) 113 as is generally known in the art of Internet access. Typical public Internet access involves such as an Internet service provider (ISP) represented herein by element number 141, which is accessed over a conventional telephone network connection system represented by element number 143. A plurality of users 145, shown connected to ISP 141 represent the most common method for public access to Internet 111. There are several other methods known in the art for accomplishing access to Internet 111 such as continual corporate connections, satellite connections, etc, and the system shown is merely exemplary.

Network 109 uses the Internet 111 and PSTN 113 in order to establish convenient access capability for users 145. Users 145, in this example may be assumed to have typical internet access capability as is known in the art, typically including a PC, a telephone line, and a modem for dialing up the ISP. Users 145 may also be operating satellite connections, WEB TV cable connections, or any other known Internet connection that may be completed using one of a variety of Internet-capable appliances, including appliances having wireless connection, such as combinations of cell phones with personal organizer and computer capability. Although there are only four users 145 represented in this example, it will be appreciated that there will be many more such that a mass clientele is established creating a heavy demand on system 109.

It is disclosed in the cross-referenced patent application that users may obtain WEB summaries relating to virtually any WEB page available on the Internet. Such Web pages include those URLs in individual URL lists maintained for the users (subscribers), any other URL that may be identified to the system by a user, and individual Web accounts. This process is automated except for directional input by the user and scripting supplied by knowledge workers, and is a function of server 128 shown in FIG. 1 within architecture 115. Server 128 is equivalent to server 31, of FIG. 1 of the cross-referenced patent application, and provides portal functions including the obtaining and presenting of Web summaries to users, as well as automatic authentication of user's accounts as gathering is done, through the features of the Portal server, which is the subject of cross-referenced patent application Ser. No. 09/208,740. In order to insure that an information gathering and summarization service such as the one described in the related application will be able to service an exceptionally large client base, a unique architecture comprising dedicate machines and networked connections must be provided Architecture 115 represents an automated data gathering and presentation system adapted to provide optimum performance in the processing of mass information requests coming in continually from users such as users 145. In this embodiment, architecture 115 is centralized (housed in one location), however; a centralized architecture is not required in order to practice the present invention. In an alternative embodiment architecture 115 may be distributed geographically throughout Internet 111.

Architecture 115 comprises a dedicated network of cooperating machines adapted to practice the functions of the present invention. Architecture 115 is hierarchical in construction in some parts meaning that pluralities of slave components at intermediate levels are ultimately directed by one master component. Architecture 115 comprises at least one scheduled update server 127 adapted to enter into and identify data-gathering job assignments that are stored in a database. A database holding such work may be stored in such as a mass repository 129 that is illustrated as connected to server 127. Mass repository 129 is in a preferred embodiment an off-line storage facility and may be accessed and updated by server 127. Mass repository 129 is large enough in terms of data-storage space to contain all user-profile and user initiated requests for information. In alternative embodiments, more than one mass repository such as repository 129 may be used. Mass repository 129 may be of any type known in the art such as an optical storage facility, or other known mass storage system, or a combination of different types.

Database server 127 distributes scheduled work assignments in hierarchical fashion to a plurality of connected distributor servers 135. Distributors 135 are connected to each other and to server 127 by dedicated network 139, as is described below with reference to FIG. 2. Each distributor server 135 contains a work queue (not shown) adapted to hold job assignments until they are requested from another distributor further down the hierarchical line, thus the distribution of tasks for distributors coupled to server 127 is by pull technology, providing efficient loading. This effectively provides a distributed queue that automatically load balances on the number of servers available. In this way work is pulled down from distributor to distributor, as respective work-queues become able to handle more work. The ultimate goal of each distributor is to pass all of it's work assignments down until they are ultimately received by a plurality of connected gatherer machines 137.

A second scheduling server 130 is connected to server 128 and is dedicated to handling not scheduled, but instant-update requests from users 145. Users may communicate such information-gathering requests to server 128 via the Internet, and server 130 acts through a second set of instant-update distributors 136 to gatherers 137. Distributors 136 do not operate by pull technology, but rather on demand to immediately execute instant update requests. These distributors have their queues refilled by user requests rather than by database queries.

Gatherers 137 are adapted to obtain work assignments from distributors 135, and perform the assigned functions with respect to each job. Each gatherer 137 has a work queue (not shown) adapted to hold job assignments passed down from distributors 135. As individual work queues become depleted, gatherers 137 request additional work from associated distributors up the line. Dedicated network 139 connects gatherers 137 to distributors 135.

It is the objective goal of all gatherers to navigate Internet 111, and pull data from WEB servers such as from servers 119–125 and process the data according to their job assignments. To achieve this purpose, each gatherer is afforded a full-time Internet connection represented herein by a data connection line 117a illustrated as teeing off backbone 117. Database server 127 also has a full-time Internet connection illustrated herein as a branch of data connection 117a. In addition to having an Internet connection for navigating Internet 111, each gatherer is provided with enough additional processing power and suitable software to perform its organization and rendering of data into a suitable format as to be compatible to users such as users 145.

Internet connectivity with respect to server 127 allows users 145 to upload data requests using suitable software on their Internet appliances. Such software is not shown here. However, a suitable example is taught in the cross-referenced patent application. The Internet connection afforded to server 127 is a user connection allowing bi-directional communication. In contrast, the Internet connections afforded to gatherers 137 are dedicated to allowing them to navigate Internet 111 and retrieve particular data according to job assignment. There is no user communication with gatherers 137. The navigation process generic to gatherers 137 is wholly automated and transparent to users.

As gatherers 137 complete their job assignments, the associated data is passed on to a plurality of machines represented herein by element number 133 and termed collectors by the inventors. Collectors 133 are computer nodes adapted to efficiently collect data and to pass the data back to the database held in mass repository 129. Collectors 133 are connected to gatherers 137 via digital network 139. Each collector accepts completed data packages passed on to them by gatherers 137. The movement of data through the hierarchy of the collectors is by push technology.

Eventually, collectors pass completed jobs on to powerful filer processors. Filers 131 are dedicated and adapted to writing finished data directly into the database stored in repository 129. In this example, following the disclosure of the cross-referenced patent application, finished data represents WEB summaries requested of system 109 by users 145 as taught in the cross-referenced patent application. Similarly, the software used in conjunction with communication system 109 could be identical or similar to the software taught therein.

It is noted here, and supported by repeated references to digital network 139 that the entire architecture 115 is held off-line (not connected to the Internet) save for the described connection to server 127 and connections provided to gatherers 137. In this regard, digital network 139 is a separate and dedicated network adapted for swift transmission of data between connected machines. In this way, no competition exists for precious bandwidth resources. In a centralized scenario such as is exemplified in this embodiment, network 139 may be implemented economically and efficiently.

Network 139 may or may not be adapted to communicate via Internet protocol as long as database server 127 has a means for interpretation and rendering of alternate data formats into HTML, XML, or another suitable format for serving the data information to users 145 (typically in the form of a WEB page). The language in any case is a markup language, and is therefore extensible over time. In order to save storage space architecture 115 may use a metadata system of communication between connected nodes and storage facility 129.

It will be apparent to one with skill in the art that the exemplary architecture described above may be used with virtually any type of information gathering service that uses a client and parent software application without departing from the spirit and scope of the present invention. For example, a large corporation or technical campus may practice the present invention privately using the architecture described above on a private or corporate WAN instead of the Internet. One may also run on a Virtual Private Network (VPN) on top of the Internet backbone. The inventor intends that architecture 115 may be used with the WEB-summary service described in the related patent application referenced above, and therefore, is designed for that purpose in this embodiment. Slight modifications may be made to machines and connections in order to adapt architecture 115 to other variations of WEB-based or network-based information gathering and presentation services.

The unique hierarchical connection scheme provided to architecture 115 provides optimum scalability to accommodate increased or decreased user demand. Furthermore, a fact that only one machine is required to have bi-directional communication capability with storage facility 129 insures economy and practicability with regard to socket connection requirements. More detail regarding the hierarchy of architecture 115 is provided below.

Figure 2:
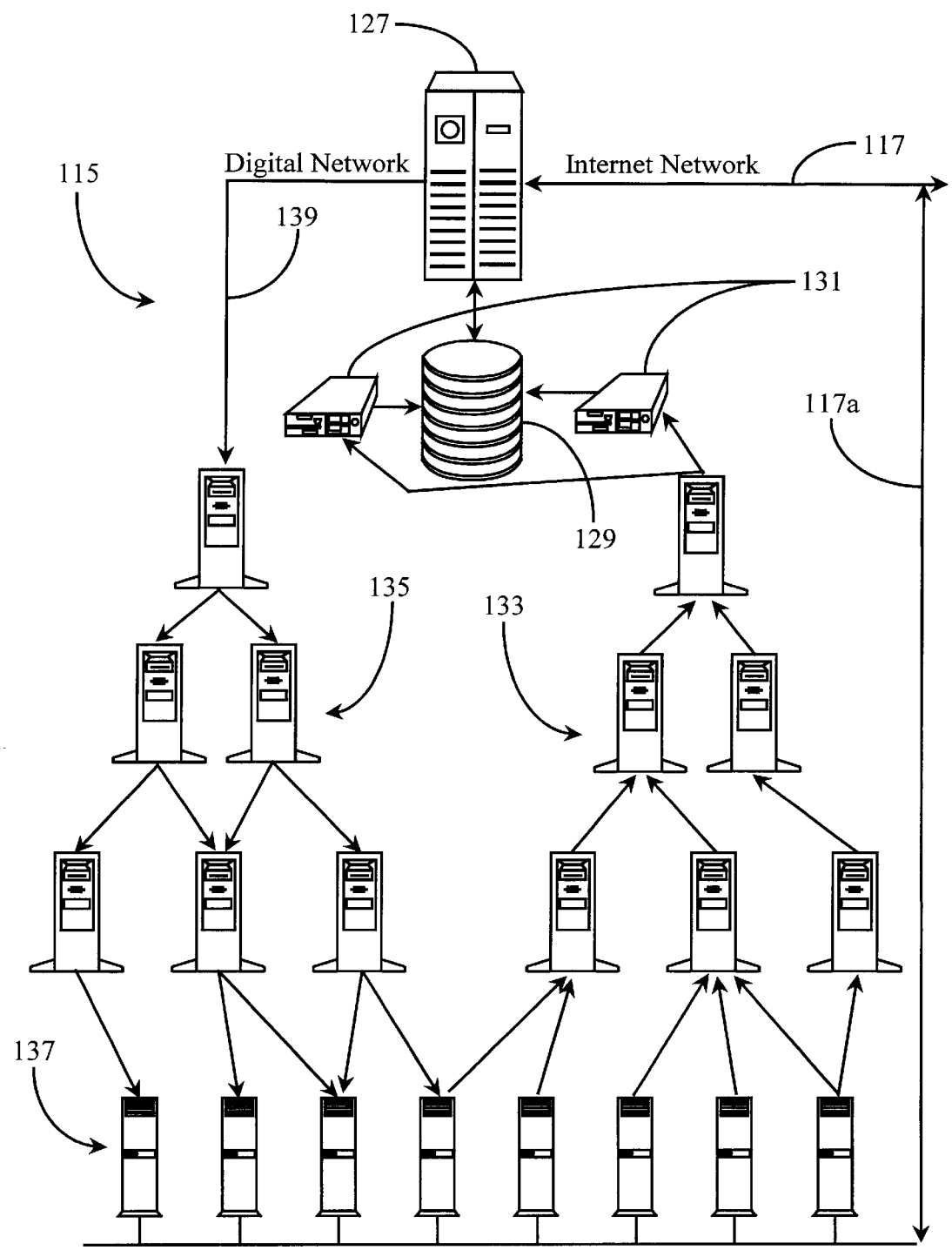
FIG. 2 is a network diagram illustrating hierarchy and communication direction of part of the automated data-gathering system of FIG. 1.

FIG. 2 is a network diagram illustrating hierarchy and communication direction of part of the architecture 115 of FIG. 1. In this example, architecture 115 is held on a separate digital network 139 as described above with reference to FIG. 1. However, in an alternative embodiment, architecture 115 may be distributed over a WAN using the WAN, which could be the Internet, as a communication medium rather than a separate digital network as described in FIG. 1.

In the above-described embodiment, all nodes would be slaved to their master nodes by addressing techniques on the WAN rather than hierarchical connection by a separate network. In still another embodiment, a separate digital network may still be provided to run in parallel with the WAN. The purpose of using a separate dedicated network to connect all nodes is to speed up transmission of data in the loop.

Referring back to FIG. 2, architecture 115 for scheduled updates utilizes database server 127 at the very top of the hierarchy. Server 127 manages data stored in repository 129 and communicates to users via Internet path 117. Server 127 has access to user-profile address lists, and users 145 (FIG. 1) also upload special requests to server 128 (FIG. 1) which are handled via server 130 and distributor hierarchy 136 (not shown in FIG. 2). As data gathering requirements come due according to user profiles and requests from users 145 are logged and stored, work assignments representing unfulfilled request are created and distributed over network 139 for scheduled requests to distributors 135 using a trickle-down pull technique as illustrated by the directional "communication" arrows connecting each distributor. For example, there are six distributors 135 represented in this hierarchical tree. The top distributor pulls assignments from server 127 and passes them on to two distributors "down the tree", which in turn pass them on to three distributors further down the tree. The passing on, however, is controlled by queues at each distributor having adjustable thresholds. As a queue at a distributor falls below a specified threshold, the distributor requests more work assignments from the higher-level distributors to which it is slaved.

It will be appreciated by one with skill in the art that there may be more than one distributor at the top of the tree passing assignments to still more distributors down the tree than are illustrated in this embodiment. The inventors intend to illustrate only the nature of cascading assignments to more and more distributors situated down the tree, by the queue-controlled pull technique.

Ultimately, a lower level of distributors 135 will distribute assignments to gatherers 137. It is the gatherer's job to accomplish the job assignments by navigating the Internet (111) by virtue of Internet connection 117a and the URL lists associated with the job assignments, and to retrieve information requested in each given job assignment held in their queues. To achieve this end, each gatherer 137 is equipped with suitable navigational software and parsing capability as described in the cross-referenced patent application. The inventors also refer to gatherers 137 as agents. In this embodiment, gathers 137 also summarize and organize retrieved data into WEB-summaries according to user direction as passed on with the work assignments. The exact nature of job performance attributed to gatherers 137 will, of course, be dictated by the software and processing capability afforded them. As previously described, other information sourced from the Internet or any other data network may be obtained and processed according to predetermined rules.

Gatherers 137 have connection ports provided and adapted for pulling information from distributors 135. Gatherers 137 are similarly provided with connection ports that are adapted for passing information to collectors 133 as illustrated by the directional "communication" arrows. These ports are associated with network 139 and not with Internet 111. A third port is provided for each gatherer to access the Internet or other designated WAN.

The gatherers are queue-managed, as are the distributors, so the gatherers pull work assignments from the distributors according to queue thresholds, just as lower-level distributors work with higher-level distributors. The collectors 133 push collected data from completed assignments from the gatherers up the collector network to the filer or filers.

It can be seen in this example that a hierarchical loop is created that ultimately ends back at repository 129. For example, A top-level collector or collectors 133 pass completed job assignments to filers 131, which are connected to and write data directly to repository 129 updating the database. Filers 131 may be provided as one or more powerful processors, or a larger number of less powerful processors. Moreover, a secondary or failsafe contingent of filers 131 may be provided and adapted to take over in the event that first-line filers fail for any reason.

Processing power may be regulated with respect to all connected nodes such that data is continually being streamed down and back up the loop created by network 139 without being held up. In one embodiment, additional failsafe connections may be provided between connected nodes at a same level in the tree such that if one node appears ready to fail or needs to be withdrawn from the hierarchy for any reason, it's queue may be emptied to adjacent nodes.

In another embodiment of the present invention, a means for detecting and mirroring duplicate requests is provided. This is provided in one embodiment in the form of a second database representing completed assignments and user attributes and a software module that checks for duplicate requests coming into server 127 against a first database containing all unfulfilled requests and those requests already in process. If a duplicate or more than one duplicate request is discovered such as, perhaps, return today's New York Times headlines, then only the leading request (one being processed) of the same nature is allowed to proceed. Once the request is written into repository 129 by one of filers 131, it is mirrored or made available to all of the users that initiated the same request. In this way, much unnecessary work may be eliminated from the process to affect streamlining.

In still another embodiment, a priority system may be used in the queuing and distribution of work assignments. In this embodiment, on-demand requests may take priority over requests that will be accessed at a later time by users. For example, priority requests may be tagged according to priority upon receipt by any means known in the art and caused to trickle through each queue according to that priority such that they may gain on and surpass other requests of lesser priority moving through the system. Any priority system may be adopted and used by system 109 according to enterprise rules.

In still a further embodiment of the present invention, gatherers 137 may, if overloaded to a point wherein they are causing an unacceptable amount of latency, use their Internet connection to send completed job assignments over Internet paths 117a and 117 to a duplicate or mirrored site that is distributed elsewhere on Internet 111. Such a mirrored site may have a separate digital network and nodes connected thereto just as architecture 115. It may be a case wherein the second site is not operating to capacity and could handle the extra load. Such a second site may be connected to a first site via Internet connection as described, or may also have a dedicated data link connecting to the first site and adapted to become active only when required for load balancing.

Server 127 is, in a preferred embodiment, adapted to notify users 145 when their requests are available in the case of user-initiated requests, and to schedule delivery of updates according to stored user profiles. This is accomplished via Internet path 117. In some cases, requests may be delivered if so ordered. In other cases they may be pulled from server 127 or another connected server adapted for the purpose. As to network 139, a push system is used. Work assignments are pushed from each node to the next. This concept acts to discourage any overload. A separate data storage facility may be provided wherein users may access completed requests. Un-accessed requests may be purged after a period of time. Similarly, requests that have been accessed or delivered are also purged from the system.

If the entire system is operating at maximum capacity, then server 127 may be programmed to slow or stop the receiving of requests until such time that the system is deemed capable of handling more work at the desired pace. Such a condition would alert system administrators of a need to scale-up according to more demand. Similarly, if there is a lull in workflow, then parts of the system may be shutdown without affecting system performance. Ultimately, a system could be scaled down if needed.

Primary access to system 109 may be provided at the ISP level such as with the Internet Portal server described in the cross-referenced patent application. Subscribers may first have to verify identity and perhaps use a password before being allowed to access server 127. In some cases, interface servers may be provided and distributed over different regions wherein requests from those servers are delivered to a server such as server 127.

It will be apparent to one with skill in the art that a networked system architecture such as architecture 115 may be wholly automated and adapted to perform a wide variety of information gathering and presentation services. For example, architecture 115 may be used for obtaining and presenting WEB-summaries as is the case in this example, or it may be adapted to such as returning review summaries to administrative workers regarding such as completed cases or other such review work. There are many possible and varied implementations. Therefore, the method and apparatus of the present invention should be afforded the broadest scope. The spirit and scope of the present invention is limited only by the claims that follow.

What is claimed is:

1. A data-gathering and reporting system for collecting WEB summaries from the Internet for individual subscribers to a Portal subscription system, comprising:

a plurality of gatherer servers each connected to the Internet, to an ascending hierarchy of work request distribution servers, and to a ascending hierarchy of collector servers;

a work request generator at the top of the hierarchy of distribution servers, generating work requests for collecting WEB summaries; and a filer server at the top of the hierarchy of collector servers, the file server connected to and writing data to a database;

wherein flow is by work requests from the work request generator down the hierarchy of distributor servers to the gatherer servers where work requests are accomplished by gathering WEB summaries from Internet servers according to the work requests, and by data collected from the gatherer servers up the hierarchy of collector servers to the filing server, and wherein gating of work assignments and data between one server and another in the hierarchy of distributor servers is by the one server having a queue with an adjustable threshold, and demanding data or work assignments from the other server as a result of the queue level falling to the threshold.

2. The system of claim 1 wherein latency and database writing efficiency is adjusted by adjusting queue thresholds among servers.

3. The system of claim 1 wherein server power and capacity required in a system is adjusted by scaling the number of servers and number of hierarchical levels of servers.

4. The system of claim 1 wherein priority is assigned to work assignments, and work assignments and collected data are gated from server to server according to assigned priority as well as by need.

5. The system of claim 1 wherein work assignments are expressed in a markup language, allowing all information required to fill an assignment to be encapsulated such that only the one or more filing servers need be connected to the database.

6. The system of claim 1 wherein some work assignments are automatically scheduled for individual subscribers and some assignments are on demand from individual subscribers.

* * * * *